JAMES G. STRANCH
MAX L. CARROLL, JR.
INVENTORS

BY William J. French
George P. Chandler
ATTORNEYS

United States Patent Office 3,586,560
Patented June 22, 1971

3,586,560
METHOD OF MAKING A FIBER-FILLED THERMOPLASTIC ARTICLE
James G. Stranch and Max L. Carroll, Jr., Kingsport, Tenn., assignors to Eastman Kodak Company, Rochester, N.Y.
Filed June 17, 1968, Ser. No. 737,708
Int. Cl. B22b 31/00; B65h 81/00
U.S. Cl. 156—167                                          7 Claims

ABSTRACT OF THE DISCLOSURE

A method for forming a fiber-filled organic plastic including the steps of (a) introducing continuous filaments into a fluid containing particles of a plastic (b) spreading the filaments apart, (c) evenly distributing the particles on the filaments, (d) coalescing the particles to coat the filaments, (e) bringing the coatings into mutual contact forming a rod-like member, (f) severing the rod-like member into short lengths. The apparatus includes a container having particles of a plastic entrained in a fluid therein, spreading means, an oven, a die and a cutter.

This invention relates to a method and apparatus for producing injection molding glass fiber reinforced plastic pellets. More particularly, this invention relates to a method and apparatus for producing an injection molding pellet of a synthetic resin or other organic plastic material containing glass reinforcing filaments.

The use of glass fiber reinforced plastic pellets in the production of articles by the process of injection molding has grown tremendously within the last few years. This growth, and the prospects for continuing growth, are attributable to the fact that the use of glass or textile type filaments in injection molding processes results in a final product having superior mechanical properties such as increased impact strength, tensile strength, flexural modulus, and the like.

At present, pellets suitable for injection molding are made by a number of techniques. For example, continuous glass filaments may be guided through a molten bath of the desired molding type synthetic resin contained in cross head die extrusion apparatus. The resulting product is an elongated rod-like article which can be cut into individual pellets suitable for being fed to an injection molding machine. Other methods of producing such a pellet include passing continuous filaments through a molten bath or emulsion of a synthetic resin to pick up the desired coating which is then cooled, dried, or heatset to form a rod-like article that can then be severed into the necessary individual pellets.

These several methods all suffer from the defect that the bundle of glass filaments passed through the bath is not readily penetrated by the resin to an appreciable extent. Rather the resin forms a sheath or coating around the bundle, and in the final injection molded product these bundles of glass fibers remain, in many instances, intact thus detracting from the appearance of the molded article. A more basic defect, however, is that these bundles indicate that a good dispersion of glass is not being achieved throughout the article and thus the reason for adding glass to the material is impaired since without good dispersion of the glass or other type filaments throughout the molded article the properties thereof are not improved to the optimum extent.

Another prior art method of forming injection molding pellets containing glass reinforcement consists of heating the resin in pellet or powder form in the barrel of an extruder along with the glass particles. The extruded product is a rod-like article which is then severed into pellets of the desired length.

A defect of this latter process resides in the fact that as glass filaments pass through the barrel of the extruder they are broken into extremely short lengths. As the mechanical properties of the final article appear to depend on the length of glass or other filament contained therein, i.e., the longer the filaments the better the properties, it is seen that this process is also not fully satisfactory.

According to the present invention it has been found that the above enumerated difficulties, among others, may be overcome by producing a pellet by the process and utilizing the apparatus according to this invention.

In accordance with the process of this invention, a bundle of glass filaments or other textile fibers are passed into a bath in which particles of the desired organic plastic material are suspended, and, while in the bath the continuous filaments are maintained in substantially non-contacting relationship so that a substantial proportion of them are at least as far apart as the diameter of a substantial proportion of the particles. In this configuration the bundle is withdrawn from the bath with an even distribution of the particles of organic plastic adhering thereto over substantially the entire surface of each of the filaments. Adherence of particles to roving is achieved by creating an electrostatic charge either on the roving or the particles. Still in its substantially non-contacting configuration the bundle of filaments is passed into an oven or a cloud of solvent vapors so that the particles become flowable and coalesce into an even coating on each of the filaments. While the coating is still liquid the filaments are compacted into closely spaced relationship so that the coatings of adjacent filaments are in contact. The coated filaments are then drawn through a forming die to produce a solid rod-like article of the desired configuration. Thereafter the coatings are allowed to assume a hardened state whereupon the rod becomes a coherent member which is then cut into a plurality of short lengths which constitute individual pellets suitable for use in injection molding machines.

By utilizing the above-outlined method nearly every filament including those lying in the interior of the pellet and those at the outermost extent of the pellet are coated with the desired organic plastic. Thus, the organic plastic and glass are uniformly distributed throughout the pellet avoiding the sheath or coating surrounding a bundle of glass which was so prevalent in the prior art while the desired fiber length is maintained. In the final article a good dispersion of glass is achieved and the reinforced organic plastic has the desired mechanical properties.

The apparatus for performing the method includes a container for a bath of organic plastic particles, e.g. resin particles, suspended in a fluid. Preferably, the fluid is a gas and the particles form a dry powder-like mass suspended therein. Contained within the bed is a surface which the continuous filaments contact and while in contact therewith change direction of movement. As the filaments are under tension, this contact with the aforedescribed surface causes them to spread until substantially all of the filaments have been separated one from the other. Ovens or containers of solvent vapors are disposed along the path of the spread stands as they emerge from the bath to change the particles into a liquid form. The spread filaments are then guided through a forming die or dies which bring them back into closely spaced relationship to produce a rod-like article having the desired shape. The rod-like article is then fed into a cutter which severs it into pellets of the desired length.

Accordingly, it is an object of this invention to produce apparatus for forming injection or extrusion molding pellets containing glass and having an even distribution of the organic plastic throughout.

Another object of this invention is a simplified, economical method for producing a molding pellet containing glass and having an organic plastic evenly distributed throughout.

A still further object of this invention is to produce a method and apparatus for forming an injection or extrusion molding pellet containing glass fibers which are completely coated by an organic plastic material.

Yet another object of this invention is to produce a method and apparatus for forming a molding pellet containing a plurality of parallel fibers completely coated by an organic plastic material.

These and other objects and advantages of this invention will be more apparent on reference to the following detailed description, appended claims, and drawings wherein:

Figure 1:
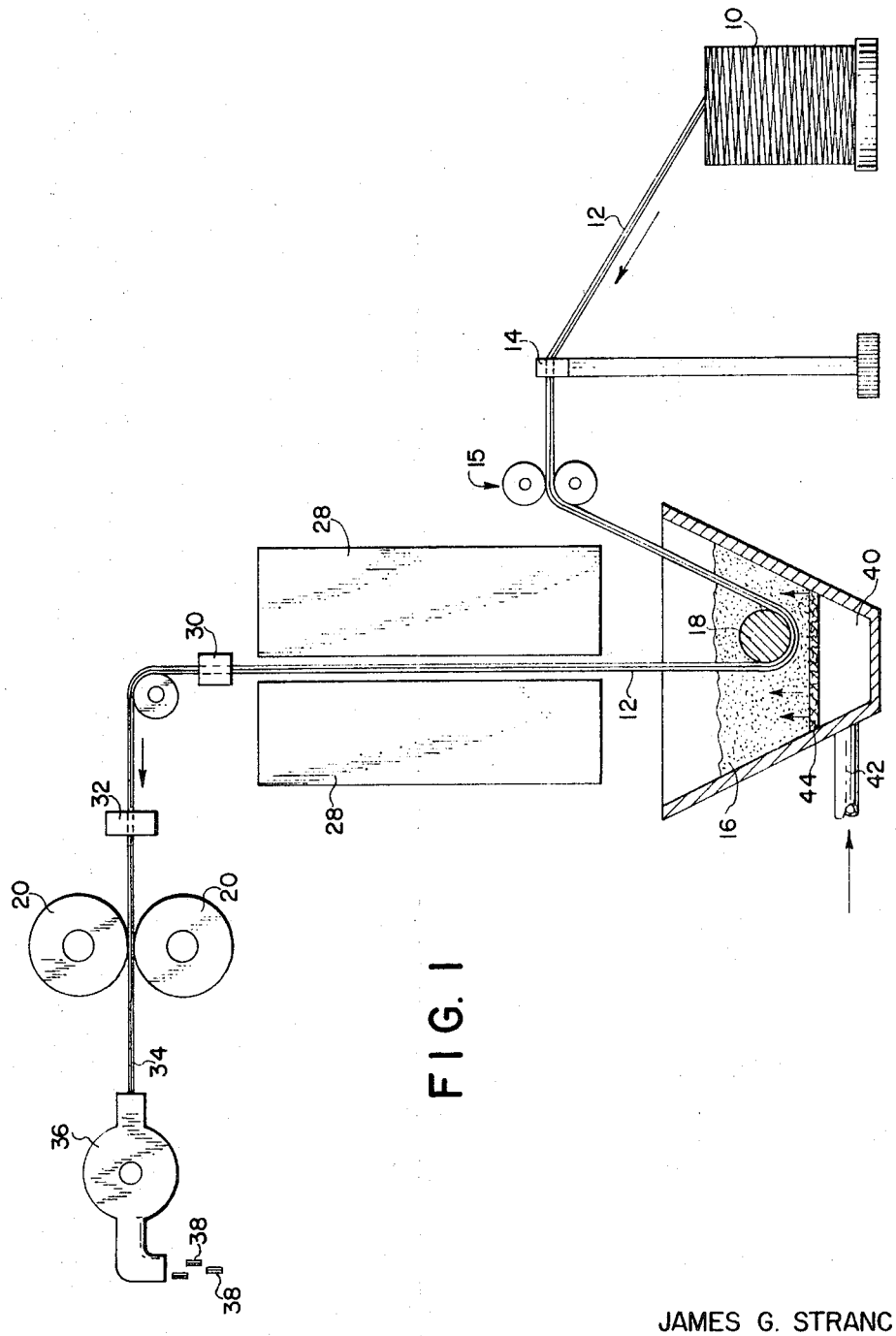
FIG. 1 is a diagrammatic view of the apparatus in accordance with this invention and showing the path of flow of the coated filaments therethrough.

With continued reference to the accompanying figures wherein like numerals designate similar parts throughout the various views, and with initial attention directed to FIG. 1, reference numeral 10 designates a supply of filamentary material which is withdrawn in strand form 12, and passed through guide member 14, driven nip rolls 15, and into a bath of resin particles 16. While passing through the bath 16 the strand of filamentary material 12 is caused to change direction by passing it across a surface on the rod-like member 18. While a member 18 having a curved surface is preferred because of reduced friction and lack of sharp edges to abrade or fracture the filamentary material, other shaped surface can also be utilized.

Figure 2:
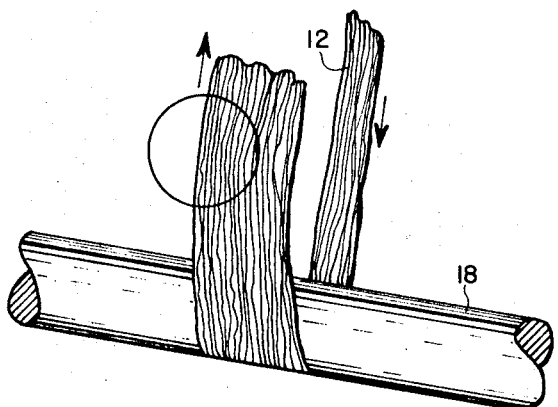
FIG. 2 is an enlarged fragmentary view illustrating the manner in which the filaments are spread apart during their passage through a portion of the apparatus of FIG. 1.

As best shown in FIG. 2, the strand of filamentary material spreads from its bundle-like configuration as it passes across the member 18 so that a substantial proportion of the individual filament are in side by side relationship. This spreading is caused by the change of direction as the filamentary strand is held under tension due to the pull exerted by driven nip rolls 20 as they overcome the resistance of the strand being drawn through nip rolls 15 which are driven at slower speed than rolls 20. The amount of spreading can be regulated by adjusting the speed of the nip rolls to either draw the strand 12 into the bath 18 at an increased or decreased rate under increased or decreased tension. If desired, a tensioning device can be inserted between the supply package 10 and the rod-like element 18. Such a tensioning device might take the form of a modified S-wrap roll such as those well known in the textile art. The amount of tension applied by such a device can be regulated by the angle through which it forces the strand 12 to travel on its way from the supply package 10 to the guide 14.

In accordance with the above description the individual filaments 24 of the strand 12 are caused to separate a distance apart such that at least a substantial proportion of them are spaced a distance equal to the diameter or largest dimension of at least a substantial proportion of the particles contained in the bath 16.

Figure 3:
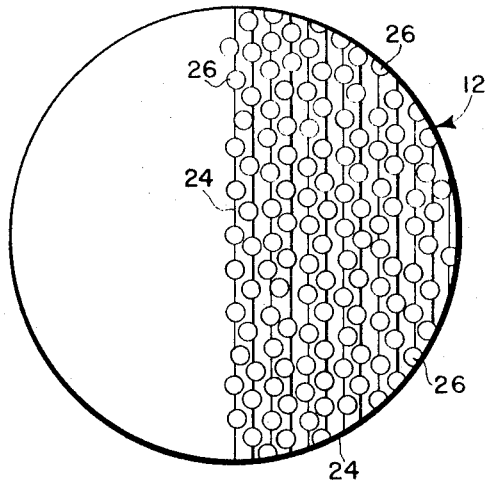
FIG. 3 is an enlarged view of that portion of a strand of filaments shown circled in FIG. 2 illustrating the distribution of organic plastic particles, e.g. resin particles, on the individual filaments.

As best shown in FIG. 3 the particles 26 adhere to the individual filaments 24 on all external surfaces thereof including those adjacent to the external surfaces of other strands. The strand 12 covered with particles 26 is withdrawn from the bath 16 and passed through oven 28 still in its spread condition. In passing through the oven 28 the particles 16 are heated to the point at which they become flowable to completely coat the external surfaces of individual strands.

After emerging from the oven 28 the strands may be passed through a Teflon or other similar material coated die 30 which is of such a size that it causes the filaments to be drawn more closely together into a bundle. As this occurs the coatings on adjacent strands come into contact and as the strand is withdrawn from the die 30 the resin coatings begin to solidify causing the bundle of filaments to become a semicoherent mass.

Before the resins are completely solidified, however, the strand is again drawn through a forming die 32 which shapes the strand into the desired configuration. If deemed desirable, the functions of dies 30 and 32 can be combined into a single die which both draws the filaments together and shapes the strand.

As the strand travels from the shaping die 32 to the nip rolls 20, it continues to solidify and becomes a relatively stiff and solid rod-like element 34. In the form of such a rod it is fed into a cutter 36 which severs it into pellets suitable for being fed into an injection molding machine.

Figure 4:
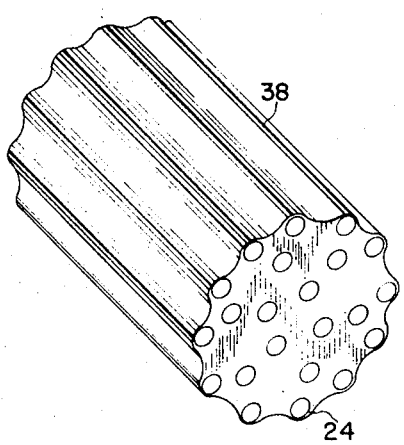
FIG. 4 is a view of a pellet as it emerges as a completed product from the apparatus.

As best shown in FIG. 4, the pellets 38 contain an even proportion of filaments 24 and resin. The resin completely surrounds each individual filament and permeates the entire bundle and does not constitute merely a coating or sheath around a bundle of filaments.

In the embodiment of the method according to the invention as specifically discussed above the coating of the filament is achieved in an oven by application of heat to the thermoplastic material. Alternatively, however, the oven 28 may be replaced with a chamber in which the vapors of a solvent are circulated around the strand to cause the particles of plastic to become flowable and remain that way until the solvent is driven off.

While as discussed above it is desirable that the filaments in the strand 12 be parallel to one another as they pass through the fluid bath 16, as a practical matter because of entanglements and broken filaments there will be some randomly disposed filaments in the strand. The method described, however, remains operative as long as a substantial proportion of these filaments are aligned in parallel relationship and the number of entanglements or broken filaments is not so great as to cause interference with the operation of the apparatus.

As the process is described above the individual filaments of the strand 12 are said to be desirably spaced apart a distance equal to the greatest dimension of the particles of plastic. All strands will not be uniformly spaced, however, because of the aforesaid broken filaments and entanglements and the variables introduced by the apparatus such as non-uniform speed and tension exerted by the nip rolls, non-uniform withdrawal of the strand from the supply package 10, and other like factors. Furthermore, the particle size of the resin will vary within given limits depending upon its type and quality. Because of such variations and the need for adhering the powder particles to at least a substantial proportion of the individual filaments of the strand, it is generally necessary to adjust the process to compensate for the above-described variables. For example, if not enough particle pick-up is observed on the strand as it emerges from the bath 16 the process can be slowed to give the strand more opportunity to come in contact with particles of a size such that they will be picked up. Further, the bath should be designed with the particle size to be utilized in mind so that the strand is emersed within the powder a sufficient length of time to produce the desired pick-up.

While it is not absolutely necessary that such be utilized in order to obtain the superior results realized by the utilization of this invention, we have found that the use of what is generally known as a fluidized bed produces the desired results. Such a fluidized bed is shown in FIG. 1 and includes a chamber 40 into which a gas under pressure is inserted through conduit 42. The chamber 40 is separated from the bath 16 by a porous member 44 which is impervious to the mass of particles contained in the bath 16. This porous member 44 may take the form of one of the well known fiberboard materials.

The gas within the chamber 40 passes through the porous member 44 and establishes a flow up through the mass of particles of resin which become entrained therein causing the mass to assume the characteristics of a fluid. Thus, the particles are continually circulated within the bath lending them to being readily picked up by the strand 12 as it passes therethrough.

While glass is preferred, the strands which may be successfully utilized in accordance with this invention include continuous filaments of inorganic materials, natural fibers, and synthetic fibers provided they melt at a temperature higher than that used for coating the filaments according to this invention; examples include poly(ethylene terephthalate), poly(1,4 - cyclohexanedimethylene terephthalate), nylon, and the like.

Likewise, various organic plastics can be utilized as long as they are adapted for use in molding processes. Examples of such materials are polyethylene terephthalate, poly(1,4 - cyclohexanedimethylene terephthalate), polyethylene, polypropylene, cellulose acetate, cellulose acetate butyrate and the like.

It has also been found that good pick-up of organic plastic particles is achieved if an electrostatic charge is induced on the strand 12 before it is carried through the bed 16. Various ways of inducing such a charge can be utilized such as running the strand through an air jet, running it between plates of different potentials, running the strands over a dielectric surface, and other known methods of producing this result.

Alternatively, the fluidized bed can be modified by placing electrodes therein so that the particles of powder pickup a charge which will cause them to be attracted to and to adhere to an oppositely charged body.

The following examples are included for a better understanding of the invention.

EXAMPLE I

A fiberglass roving containing on the average of 60 ends, 204 filaments per end, and about 218 yards per pound, is coated in accordance with this invention with 100 mesh poly(ethylene terephthalate) powder having an inherent viscosity of about 0.6. The roving is fed at a speed of about 15 feet per minute and maintained under sufficient tension to cause the roving to spread as it passes over the surface of the rod-like member 18. The roving coated with particles of the poly(ethylene terephthalate) powder is passed through an oven containing 12 high density infrared heaters disposed along its path to raise the temperature of the powder particles above their melting point so that they become liquid and coalesce to coat the individual filaments of the spread roving. The heated roving is then passed through forming dies to produce a rod-like article which is cut into the desired lengths on a Finn and Fram pinch-off type cutter resulting in pellets ⅛″ x ½″ long. Each pellet is found to contain about 50% glass and about 50% resin, a ratio found throughout the pellet.

The above-described pellet is mixed with poly(ethylene terephthalate) pellets ⅛″ x ⅜″ long and having the same characteristics as the above-described polymer but containing no glass fibers. The final mixture contains 20% by weight glass. This mixture is molded under the following conditions in a six-ounce screw-ram type injection molding machine under the conditions set forth in Table 1. The article produced is a standard Type 1, 0.125 inch thick tensile bar as described in ASTM D638–60T having an excellent dispersion of fibers therein.

TABLE 1

Mold:
- Number of cavities ---------------- 2
- Shot size, oz. (g.) ---------------- 2.5(71)

Cylinder temperature, °F. (°C.):
- Rear ---------------------------- 540(282)
- Center -------------------------- 540(282)
- Front --------------------------- 540(282)
- Nozzle -------------------------- 560(293)

Melt temperature, °F. (°C.) ------------ 530(277)
Mold temperature, °F. (°C.) ----------- 295(146)
Injection pressure, p.s.i. (kg./cm.$^2$)
  8,000–10,000(562–703)

Cycle time, seconds:
- Injection ------------------------- 15
- Cooling -------------------------- 35
- Overall -------------------------- 50

Screw speed --------------------------- 60

Tensile bars produced in this manner are tested for physical and thermal properties, mechanical properties and electrical properties with the results set forth in Tables 2, 3 and 4 below.

TABLE 2.—PHYSICAL AND THERMAL PROPERTIES

| | ASTM test method | Value |
|---|---|---|
| Specific gravity | D 792 | 1.50 |
| Moisture absorption, percent | D 570 | 0.6 |
| Specific heat, cal./gm., °C. (75° C. to 200° C.) | D 351 | [1] 0.35 |
| Deflection temperature, °C. at— | | |
| 264 p.s.i. | ⎫ | ⎧ 250 |
| 466 p.s.i. | ⎬ D 648 | ⎨ 230 |
| 600 p.s.i. | ⎭ | ⎩ 220 |
| Mold shrinkage, percent | | 0.14 |
| Coefficient of linear thermal expansion, in./in./°C. (−30 to 120° C.) | D 696 | 2.3×10$^{-5}$ |
| Burning rate, in./min. | D 635 | 0.8 |

[1] Calculated.

TABLE 3.—MECHANICAL PROPERTIES

| | ASTM test method | Value |
|---|---|---|
| Tensile strength, p.s.i. at fracture | D 638 | 18,000 |
| Impact strength, ft. lb./in.: | | |
| Notched charpy at 23° C | D 256 | 8.5 |
| Notched izod at 23° C | D 256 | 3.0 |
| Notched izod at −40° C | D 758 | 3.0 |
| Unnotched izod at 23° C | D 256 | 7.5 |
| Unnotched izod at −40° C | D 758 | 6.0 |
| Rockwell hardness, M scale | D 785 | 85 |
| Abrasion resistance, taber H-22, gm./1,000 rev. | D 1044 | 0.2 |
| Flexural modulus, p.s.i. | D 790 | 9.0×10$^5$ |

TABLE 4.—ELECTRICAL PROPERTIES

| | ASTM test method | Value |
|---|---|---|
| Dielectric strength, v./mil (thickness 0.050 in. step by step). | D 149 | 690 |
| Dielectric constant, at 1 mc | D 150 | 3.50 |
| Dissipation factor, at 1 mc | ⎱ D 130 | ⎰ 0.02 |
| Volume resistivity, ohm cm | ⎰ | ⎱ 3.0×10$^{15}$ |

EXAMPLE II

A fiber glass roving of approximately 60 ends, 204 filaments per end, and about 218 yards per round, is coated in the exact manner set forth in Example I except that a speed of 18 feet per minute is used and the polymer is 50 mesh polyethylene powder having a density of 0.923 gram/cc., a Vicat softening point of 92° C., and a flow rate of 22 grams/10 min. at 190° C. The cut pellet is ⅛″ x ⅜″ long and contains 60 parts by weight glass and 40 parts by weight polymer. The ratio of glass to polymer is uniform throughout the pellet.

The above pellet is mixed with either 4.5 g./10 min. at 230° C. flow rate polypropylene having a density of 0.902 gram/cc., and a Vicat softening point of 145° C., or 2.5 g./10 min. at 230° C. flow rate polypropylene having a density of 0.902 g./cc. and a Vicat softening point of 146° C., such that the final mixture contains 20% by weight glass. Either mixture is injection moldable into articles having excellent dispersion of the fiber therein.

EXAMPLE III

A fiber glass roving of approximately 60 ends, 204 filaments per end, and about 218 yards per pound is coated in the exact manner set forth in Example I except that a speed of 18 feet per minute is used and the polymer is 50 mesh polypropylene powder having a density of 0.904 gram/cc., a Vicat softening point of 145° C., and a flow rate of 9 grams/10 min. at 230° C. The cut pellet is 1/8" x 3/8" long and contains 60 parts by weight glass and 40 parts by weight polymer. The ratio of glass to polymer is uniform throughout the pellet.

The above pellet is mixed with 4.5 grams/10 min. at 230° C. flow rate polypropylene having a density of 0.902 g./cc., and a Vicat softening point of 145° C. to give a final mixture containing 20% by weight glass. This mixture is injection moldable into articles having excellent dispersion of the fibers therein.

EXAMPLE IV

Poly(ethylene terephthalate) yarn of 33 filaments 70 denier each is coated in the exact manner set forth in Example I except that only 8 infrared heaters are used, the speed is 18 feet per minute, and the polymer is 50 mesh polyethylene powder having a density of 0.923 gram/cc., a Vicat softening point of 92° C. and a flow rate of 22 grams/10 min. at 190° C. The cut pellet is 1/8" x 3/8" long and contains 40 parts by weight polymer and 60 parts by weight fibers. The ratio of fiber to polymer is uniform throughout the pellet.

The above pellet is mixed with 4.5 grams/10 min. at 230° C. flow rate polypropylene having a density of 0.902 gram/cc. and a Vicat softening point of 145° C. to give a final mixture containing 20% by weight of filaments. This mixture is injection moldable into article having excellent dispersion of the fibers therein.

In each of the above examples the following ASTM test methods are used to determine the characteristics of the various polymers.

| | |
|---|---|
| Flow rate | D1238L. |
| Density | D1505. |
| Vicat softening point | D1525. |
| Inherent viscosity | Determined at 25° C. in 60:40 weight to weight ratio of phenol and tetrachloroethane in which the polymer concentration is 0.23 weight percent. |

By following the method described above, a superior injection molding pellet can be produced. The pellet will have a uniform dispersion of fibers throughout and will, therefore, produce a uniform dispersion of fibers in the molded article. Simplicity of operation and apparatus also serve to render this superior pellet less expensive than that produced by the prior art methods discussed above.

The invention has been described in detail with particular reference to preferred embodiments thereof, but it will be understood that variations and modifications can be effected within the spirit and scope of the invention as described hereinabove and as defined in the appended claims.

We claim:
1. A method for forming a substantially solid article composed of an organic thermoplastic material and a plurality of substantially parallel filaments comprising the steps of:
  (a) providing a gas maintained in a flowing condition and containing a suspension of particles of an organic thermoplastic coating material;
  (b) contacting said gas containing said particles with said filaments while said filaments are in substantially non-contacting substantially parallel relationship whereby said particles are distributed over substantially the entire surface of each filament;
  (c) coalescing said particles by heating to above the melting temperature of said thermoplastic material to substantially completely coat each of said filaments;
  (d) compacting said filaments while the coalesced coating material is in a substantially plastic condition thereby forming said article; and
  (e) hardening said coating material whereby said article becomes solid.

2. A method according to claim 1 wherein said thermoplastic is a linear polyester.

3. A method according to claim 1 wherein said filaments are spread into substantially non-contacting relationship a distance at least equal to the largest dimension of a substantial portion of said particles.

4. A method according to claim 2 wherein said filaments are glass.

5. A method according to claim 3 wherein said filaments are spread by maintaining them under tension as they are caused to change direction by being pulled across a surface.

6. A method according to claim 2 wherein said coherent, solid article is cut into short lengths forming pellets.

7. A method according to claim 6 wherein said pellets are about 1/2" long.

References Cited

UNITED STATES PATENTS

| | | | |
|---|---|---|---|
| 2,273,082 | 2/1942 | Aldrich | 156—167 |
| 2,333,699 | 11/1943 | Brosi | 156—167 |
| 2,938,821 | 5/1960 | Nack | 156—167 |
| 2,940,886 | 6/1960 | Nachtman | 156—167 |
| 3,023,075 | 2/1962 | Larman et al. | 156—167 |
| 3,158,519 | 11/1964 | Shannon et al. | 156—296 |
| 3,220,905 | 11/1965 | Doob, Jr., et al. | 156—296 |

CARL D. QUARFORTH, Primary Examiner

R. L. TATE, Assistant Examiner

U.S. Cl. X.R.

156—161, 180, 296